US012732866B2

(12) United States Patent
Henry et al.

(10) Patent No.: US 12,732,866 B2
(45) Date of Patent: Sep. 8, 2026

(54) METHOD, APPARATUS, AND MEDIUM FOR PERFORMING TIME MEASUREMENT EXCHANGE BETWEEN STATIONS

(71) Applicant: Cisco Technology, Inc., San Jose, CA (US)

(72) Inventors: Jerome Henry, Pittsboro, NC (US); Akram Sheriff, San Jose, CA (US); Robert Edgar Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 300 days.

(21) Appl. No.: 18/470,106

(22) Filed: Sep. 19, 2023

(65) Prior Publication Data

US 2025/0097774 A1 Mar. 20, 2025

(51) Int. Cl.

| | |
|---|---|
| ***H04W 28/16*** | (2009.01) |
| ***G06N 20/00*** | (2019.01) |
| ***G06N 20/20*** | (2019.01) |
| ***H04L 5/00*** | (2006.01) |
| ***H04W 24/10*** | (2009.01) |

(Continued)

(52) U.S. Cl.

CPC ............ *H04W 28/16* (2013.01); *G06N 20/20* (2019.01); *H04L 5/0048* (2013.01); *H04W 24/10* (2013.01); *H04W 28/0975* (2020.05); *H04W 84/12* (2013.01)

(58) Field of Classification Search

CPC . H04W 28/16; H04W 24/10; H04W 28/0975; H04W 84/12; H04L 5/0048; G06N 20/00

See application file for complete search history.

(56) References Cited

U.S. PATENT DOCUMENTS

2018/0091949 A1 3/2018 Steiner et al.
2019/0069267 A1 2/2019 Seok et al.
2020/0068521 A1* 2/2020 Fang .................... G01S 5/0205

(Continued)

FOREIGN PATENT DOCUMENTS

EP 3978949 A2 * 4/2022 ........... G01S 13/003

OTHER PUBLICATIONS

Jérôme Henry, Indoor Location: study on the IEEE 802.11 Fine Timing Measurement standard, Jan. 17, 2022, HAL open science [online], [retrieved on Apr. 24, 2026]. Retrieved from the Internet <URL: https://theses.hal.science/tel-03528701/file/2021IMTA0272_Henry-Jerome.pdf> (Year: 2022).*

*Primary Examiner* — Omar J Ghowrwal
(74) *Attorney, Agent, or Firm* — Polsinelli P.C.

(57) ABSTRACT

A system and method are provided for timing measurement in a wireless network to determine a location of a station (STA). A channel stability is determined for a channel between an initiating station (ISTA) and a first responding station (RSTA). A request for a first timing-measurement exchange is sent from the ISTA and the first RSTA. Parameters are negotiated for the first timing-measurement exchange based on the determined channel stability, and then the timing-measurement exchange is performed to generate a first set of times. This process is then repeated for another timing-measurement exchange between the ISTA and a second RSTA to generate a second set of times. A location of the ISTA is determined based on the first and the second sets of times.

19 Claims, 9 Drawing Sheets

(51) Int. Cl.
*H04W 28/08* (2023.01)
*H04W 84/12* (2009.01)

(56) References Cited

U.S. PATENT DOCUMENTS

| | | | | |
|---|---|---|---|---|
| 2021/0075542 | A1* | 3/2021 | Kneckt | H04L 1/0061 |
| 2021/0364597 | A1 | 11/2021 | Sheriff et al. | |
| 2021/0392568 | A1 | 12/2021 | Henry et al. | |
| 2022/0201480 | A1 | 6/2022 | Luo et al. | |
| 2023/0014580 | A1* | 1/2023 | Zhu | G01C 21/3867 |
| 2023/0087308 | A1 | 3/2023 | Smith et al. | |
| 2024/0094381 | A1* | 3/2024 | Zhang | G01S 13/767 |

* cited by examiner

METHOD, APPARATUS, AND MEDIUM FOR PERFORMING TIME MEASUREMENT EXCHANGE BETWEEN STATIONS

BACKGROUND

In a wireless network, various techniques can be used to determine the location of a station (STA). These techniques include signal-based techniques and time of flight (ToF) techniques. Both of these types of techniques can significantly degrade in challenging environments, such as in a highly reflective environment resulting in multipath signals or in a dense Internet of Things (IoT) environment with a large amount of data traffic. Examples of challenging environments can include factories, warehouses, amusement park rides, etc. In such environments, Wi-Fi® asset tracking can be difficult.

Signal-based techniques such as received signal strength indicator (RSSI)-based techniques, are known to be inaccurate in standard environments, and, in difficult environments, signal-based techniques become essentially unusable.

ToF techniques, such as the Fine Timing Measurement (FTM) ranging technique in the IEEE 802.11 Standard, are more promising. For example, FTM allows the initiating station (ISTA) to range against individual access points (APs), which are referred to as responding stations (RSTAs). With the 802.11az amendment to the IEEE 802.11 Standard, the ISTA can then report its range to the infrastructure for asset tracking. In line of sight (LoS) scenarios, ranging accuracy below one meter is possible, and this accuracy can be further improved by combining results from multiple RSTAs.

However, this accuracy can significantly degrade in reflective (e.g., multi-path) and other challenging environments. The signal from the RSTA may reflect from obstacles and arrive late to the ISTA. With multipath and obstacles in the LoS path, the reflected signal can sometimes be recognized as the principal component (e.g., the LoS signal can be the largest signal and the first signal to arrive). However, multipath environments can cause a canyon effect in which the detected range is greater than the actual LoS distance between the ISTA and the RSTA. In other cases, the environment between a given RSTA and the ISTA is so complex that meaningless measurements are obtained. For example, echoes from previous or other frames interfere with the FTM exchange, causing the ranging for the ISTA to conclude on impossibly short distances.

Thus, there is a need for a method to improve FTM ranging to overcome the above-noted shortcomings of current methods for challenging environments, such as in multipath environments and in IoT contexts.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
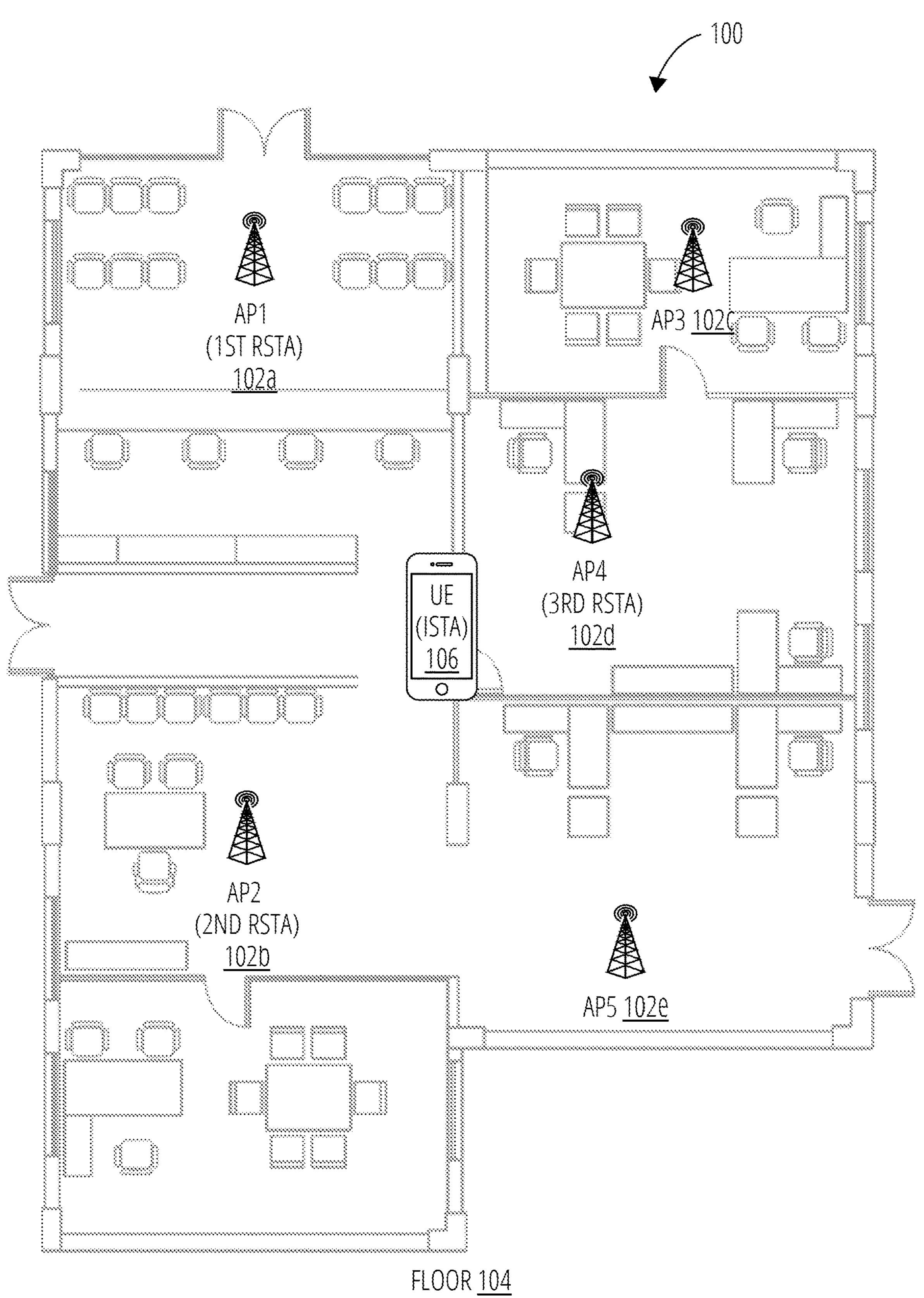
FIG. 1A illustrates a schematic diagram for an example of a wireless system within the system network, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

In one aspect, a method for timing measurement in a wireless network to determine a location of a station (STA). The method includes determining a channel stability of a first channel between an initiating station (ISTA) and a first responding station (RSTA); and sending, between the ISTA and the first RSTA, a request for a first timing-measurement exchange. The method further includes negotiating parameters for the first timing-measurement exchange between the ISTA and the first RSTA based on the determined channel stability; and performing the timing-measurement exchange between the ISTA and first RSTA in accordance with the determined parameters and generating thereby a first set of times. The method further includes performing another timing-measurement exchange between the ISTA and a second RSTA to generate a second set of times; and determining a location of the ISTA based on the first set of times and the second set of times.

In another aspect, the method may also include that determining the channel stability comprises determining a channel stability metric based on channel state information (CSI) and a received signal strength indicator (RSSI).

In another aspect, the method may also include that negotiating the parameters for the first timing-measurement exchange is based on the determined channel stability, a quality of service (QoS) indicated for other data traffic on the first RSTA, a volume of the other data traffic on the first RSTA, channel state information (CSI), a received signal strength indicator (RSSI), and/or a predicted efficiency of the first timing-measurement exchange.

In another aspect, the method may also include predicting values for respective access points (APs) in a neighborhood of the ISTA, wherein the predicted values include channel state information (CSI), values for a received signal strength indicator (RSSI), and/or quality of service (QoS) values of traffic for the respective APs; and recommending, to the ISTA, one or more candidate APs for the first RSTA and/or the second RSTA, the one or more candidate APs being selected from the APs in the neighborhood of the ISTA based on the predicted values.

In another aspect, the method may also include recommending to the ISTA one or more access points (APs) as candidate APs for the first RSTA and/or the second RSTA, wherein the candidate APs as determined based on a machine learning (ML) method that uses historical data to predict, for respective APs in a neighborhood of the ISTA, channel state information (CSI), values for a received signal strength indicator (RSSI), and/or quality of service (QoS) values of traffic for the respective APs.

In another aspect, the method may also include negotiating the parameters for the first timing-measurement exchange further comprises the first RSTA determining, based on the determined channel stability, whether to accept or reject the first timing-measurement exchange.

In another aspect, the method may also include selecting, after the first RSTA accepts the first timing-measurement exchange, a next access point (AP) for the ISTA to request a timing-measurement exchange, wherein the next AP is predicted by a machine learning (ML) method that has been trained using historical data of sequences of FTM exchanges in a neighborhood of the ISTA.

In another aspect, the method may also include instructing the first RSTA to return values of a neighbor report; and selecting, using the values of a neighbor report, the next AP for the ISTA to request the timing-measurement exchange.

In another aspect, the method may also include that the ML method selects the next AP based on one or more inputs that include a predicted location of the ISTA, channel state information (CSI), values for a received signal strength indicator (RSSI), and/or quality of service (QoS) values of traffic for the first RSTA or the second RSTA.

In another aspect, the method may also include that the ML method selects the next AP based on a score that is representative of a likely accuracy of the location that is obtained from a timing-measurement exchange between the ISTA and the next AP.

In another aspect, the method may also include that the ML method selects the next AP based on a score that is representative of a likelihood that a timing-measurement exchange between the ISTA and the next AP interferes with other traffic on the next AP that has a predefined QoS.

In another aspect, the method may also include determining, by a network controller, a set of access points (APs) within the wireless networks are likely to have cells overlapping the location of the ISTA; recommending a first subset of APs of the set of APs that are likely to provide better timing-measurement exchanges than a second subset of APs of the set of APs that excludes the first subset of APs; and steering the ISTA to perform the timing-measurement exchanges with APs in the first subset.

In another aspect, the method may also include that steering the ISTA to perform the timing-measurement exchanges with the APs in the subset is performed by: sending a first instruction to the second subset of APs to reject requests for timing-measurement exchanges from the ISTA.

In another aspect, the method may also include determining, based on the first set of times, a first locus of points along which the ISTA is predicted to be located; determining, based on the second set of times, a second locus of points along which the ISTA is predicted to be located; and determining a location of the ISTA based on an intersection between the first locus of points and the second locus of points.

In another aspect, the method may also include that the first set of times and the second set of times represent time of flight (ToF) values, the first locus of points forming a first circle, and the second locus of points forming a second circle.

In another aspect, the method may also include receiving, at a location engine, the first set of times and the second set of times, wherein the first set of times and the second set of times represent time of flight (ToF) values, the first locus of points is a first circle, and the second locus of points is a second circle; receiving from one or more access points (APs) on a same channel as the first RSTA observations of the first timing-measurement exchange to generate a third set of times representing time difference of arrival (TDoA) values; determining, based on the third set of times, a third locus of points that represents a hyperbola; and determining the location of the ISTA based on the first locus of points, the second locus points, and the third locus of points.

In another aspect, the method may also include that negotiating the timing measurements between the ISTA and the RSTA is further based on an amount of traffic through the first RSTA, and a level of the quality of service (QoS) indicated for the traffic through the first RSTA.

In another aspect, the method may also include determining, based on a value of the channel stability for the first RSTA, a first weight based on a degree of uncertainty for the first set of times; determining, based on a value of the channel stability metric for the second RSTA, a second weight based on a degree of uncertainty for the second set of times; and determining the location of the ISTA based on the second weight, the first weight, the first set of times, and the second set of times.

In one aspect, a computing apparatus includes a processor. The computing apparatus also includes a memory storing instructions that, when executed by the processor, configure the apparatus to perform the respective steps of any one of the aspects of the above-recited methods.

In one aspect, a computing apparatus includes a processor. The computing apparatus also includes a memory storing instructions that, when executed by the processor, configure the apparatus to determine a channel stability of a first channel between an initiating station (ISTA) and a first responding station (RSTA); send, between the ISTA and the first RSTA, a request for a first timing-measurement exchange; negotiate parameters for the first timing-measurement exchange between the ISTA and the first RSTA based on the determined channel stability; perform the timing-measurement exchange between the ISTA and first RSTA in accordance with the determined parameters and generating thereby a first set of times; perform another timing-measurement exchange between the ISTA and a second RSTA to generate a second set of times; and determine a location of the ISTA based on the first set of times and the second set of times.

In one aspect, a non-transitory computer-readable storage medium includes instructions that when executed by a computer, cause the computer to perform the respective steps of any one of the aspects of the above-recited methods.

In one aspect, a non-transitory computer-readable storage medium includes instructions that when executed by a computer, cause the computer to: determine a channel stability of a first channel between an initiating station (ISTA) and a first responding station (RSTA); send, between the ISTA and the first RSTA, a request for a first timing-measurement exchange; negotiate parameters for the first timing-measurement exchange between the ISTA and the first RSTA based on the determined channel stability; perform the timing-measurement exchange between the ISTA and first RSTA in accordance with the determined parameters and generating thereby a first set of times; perform another timing-measurement exchange between the ISTA and a second RSTA to generate a second set of times; and determine a location of the ISTA based on the first set of times and the second set of times.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for a wireless ranging method that is robust to challenging environments, such as in multipath environments and in IoT contexts where ranging measurements have the potential to disrupt other important data traffic.

FIG. 1A illustrates a wireless system 100 having various access points (APs) distributed throughout floor 104. Here, the APs include AP1 102*a*, AP2 102*b*, AP3 102*c*, AP4 102*d*, and AP5 102*e*. The wireless system 100 also includes user equipment (e.g., 106). The wireless system 100 can be used to perform ranging based on timing measurements, such as the fine-timing measurements (FTM) described in §§ 6.3.55-56 and 11.21.5-6 of IEEE, "IEEE Approved Draft Standard for Information Technology-Telecommunications and Information Exchange between Systems Local and Metropolitan Area Networks-Specific Requirements Part 11: Wireless LAN Medium Access Control (MAC) and Physical Layer (PHY) Specifications," (hereinafter "IEEE Std 802.11-2020") and in IEEE, "IEEE Approved Draft Standard for Information technology-Telecommunications and information exchange between systems Local and metropolitan area networks-Specific requirements Part 11: Wireless LAN Medium Access Control (MAC) and Physical Layer (PHY) Specifications—Amendment 4: Enhancements for positioning," IEEE P802.11az/D7.0, September 2022, (hereinafter "IEEE 802.11az"), both of which are herein incorporated by reference in their entirety.

In FIG. 1A, all five APs have cells that overlap with a location of the UE 106. That is the five APs are in an RF neighborhood of UE 106. In this nonlimiting example, the UE 106 is the initiating station (ISTA) for the timing measurements, and AP1 102*a* is selected to be the first responding station (1st RSTA). Similarly, AP2 102*b* is selected to be the second responding station (2nd RSTA), and AP4 102*d* is selected to be the third responding station (3rd RSTA).

Figure 1B:
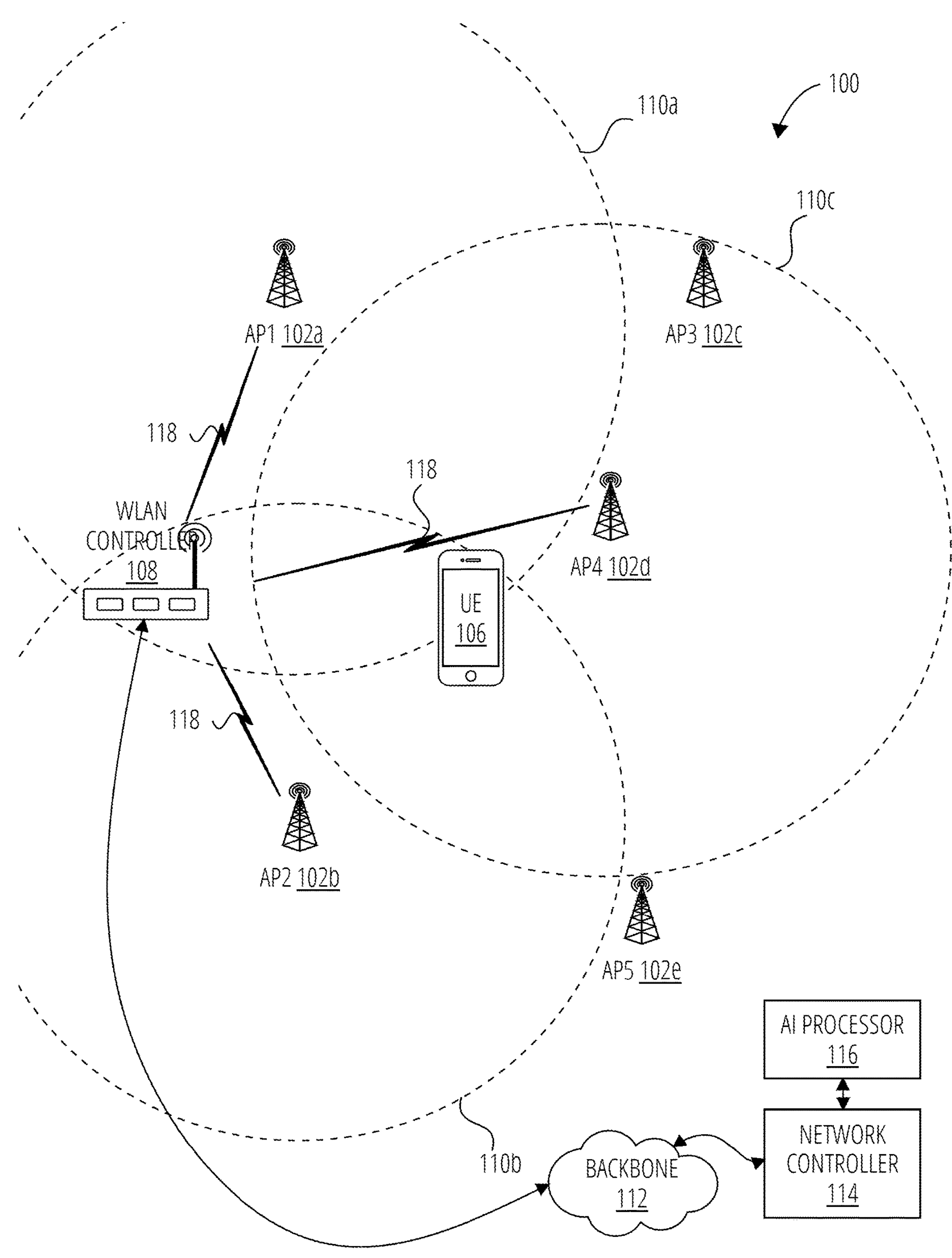
FIG. 1B illustrates a block diagram for an example of a wireless network, in accordance with some embodiments.

With reference to FIG. 1B, in this non-limiting example, a 1st cell 110*a* of AP1 102*a* overlaps the UE 106. Similarly, a 2nd cell 110*b* of AP2 102 overlaps the UE 106, and a 3rd cell 110*c* of AP4 102*d* overlaps the UE 106. Each of these three APs communicates with a wireless local area network (WLAN) controller 108 via direct wireless link 118. The WLAN controller 108 is then connected to a backbone 112, which connects to a network controller 114. Optionally, the network controller 114 can connect to or include an artificial intelligence (AI) Processor 116. The timing measurements are carried out between the ISTA (e.g., UE 106) and the respective RSTAs (e.g., AP1 102*a*, AP2, and AP4 102*d*). Then the location of the ISTA can be calculated by a location engine, which can be in the ISTA, RSTA, the WLAN controller 108, the network controller 114, the AI processor 116, or any combination of two or more of these devices.

Figure 1C:
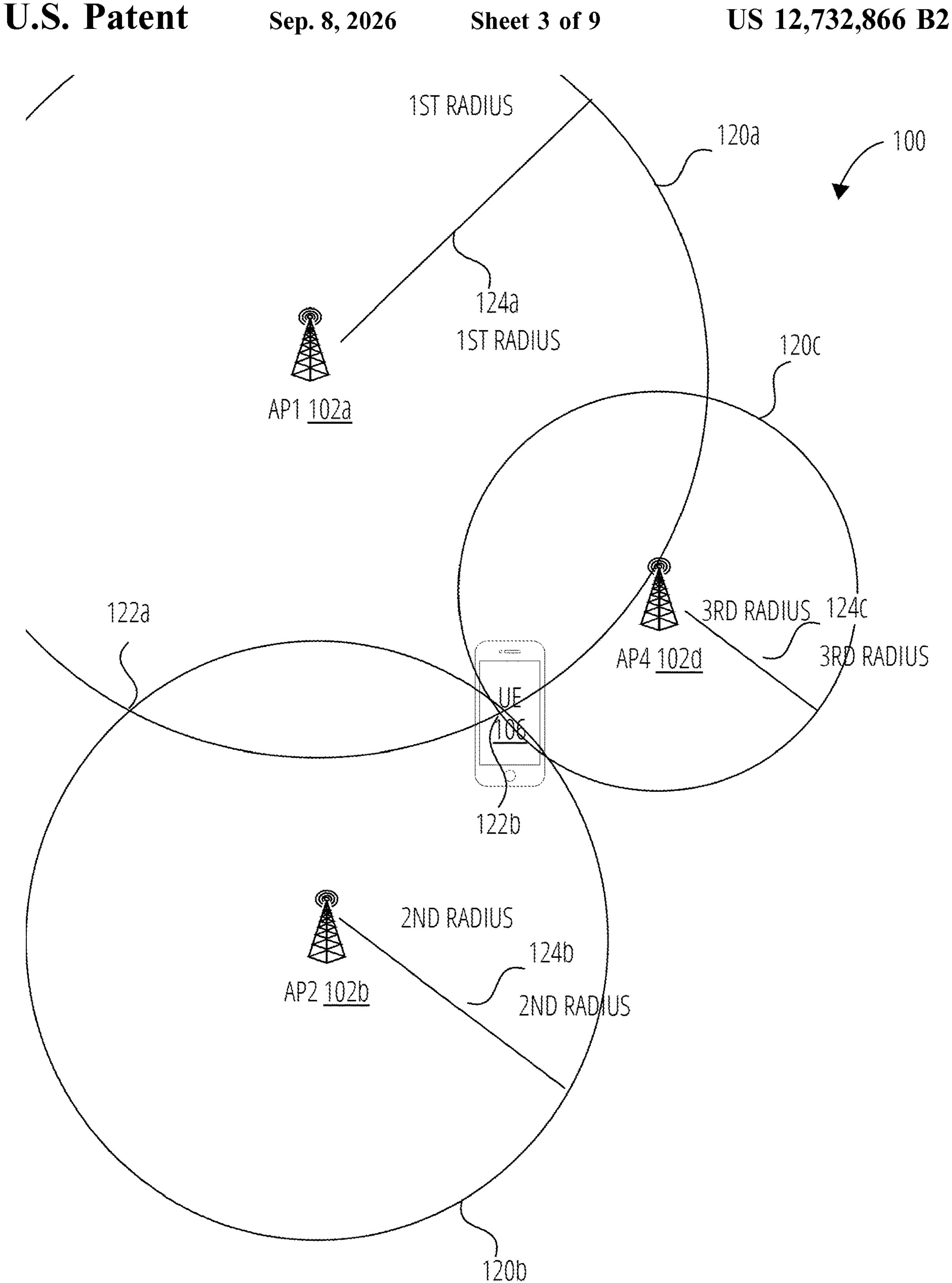
FIG. 1C illustrates a diagram for an example of time of flight (ToF) ranging in a wireless network, in accordance with some embodiments.

FIG. 1C illustrates a non-limiting example in which a time of flight (TOF) or time of arrival (ToA) measurement scheme is used to determine the location of the UE 106. A set of timing measurements is generated between the ISTA and each of the RSTAs. For example, a first set of times measured between UE 106 and AP1 102*a* is used to determine that the distance between them is the 1st radius 124*a*, and therefore the UE is located on the locus of points defining the 1st circle 120*a*.

Similarly, a second set of times measured between UE 106 and AP2 102*b* is used to determine that the distance between them is the 2nd radius 124*b*, and therefore the UE is located on the locus of points defining the 2nd circle 120*b*. Based on these two sets of times, the location of the UE 106 can be predicted to be at either the 1st intersection 122*a* or the 2nd intersection 122*b* between the 1st circle 120*a* and the 2nd circle 120*b*.

In three-dimensional (3D) space, the respective radii define spheres, and their intersection defines a circle. Generally, practical limitations (e.g., the ISTA is located on the surface of the Earth) constrain the possible locations for the ISTA to a two-dimensional (2D) sheet (e.g., the surface of the Earth). Consequently, the discussion herein focuses on finding the location of the ISTA within a 2D space. But if necessary, the disclosure herein of systems and methods for determining the location of an ISTA can be straightforwardly generalized to higher dimensions, as would be understood by a person of ordinary skill in the art.

A third set of times between the ISTA (e.g., the UE 106) and the 3rd RSTA (e.g., AP4 102*d*) is used to disambiguate between the 1st intersection 122*a* and the 2nd intersection 122*b*. In FIG. 1C, the third set of times is used to determine that the distance between UE 106 and AP4 102*d* is the 3rd radius 124*c*, and therefore the UE is located on the locus of points defining the 3rd circle 120*c*. The 3rd circle 120*c* intersects with the other two circles at the 2nd intersection 122*b*, indicating that UE 106 is located at the 2nd intersection 122*b*.

In practice, an uncertain value (e.g., the statistical variation or standard deviation) can be determined for each of the three radius values. This uncertain value can be represented by the respective widths of the lines for each of the circles, and the predicted location of the UE 106 can be within an area in which the line widths overlap. For example, the predicted location of the UE 106 can be a point that minimizes the Euclidian distance from the respective circles, especially when the uncertainty values are the same for each of the radii. Further, the predicted location of the UE 106 can be determined by weighting more heavily the calculated radii having smaller uncertainty values.

Figure 1D:
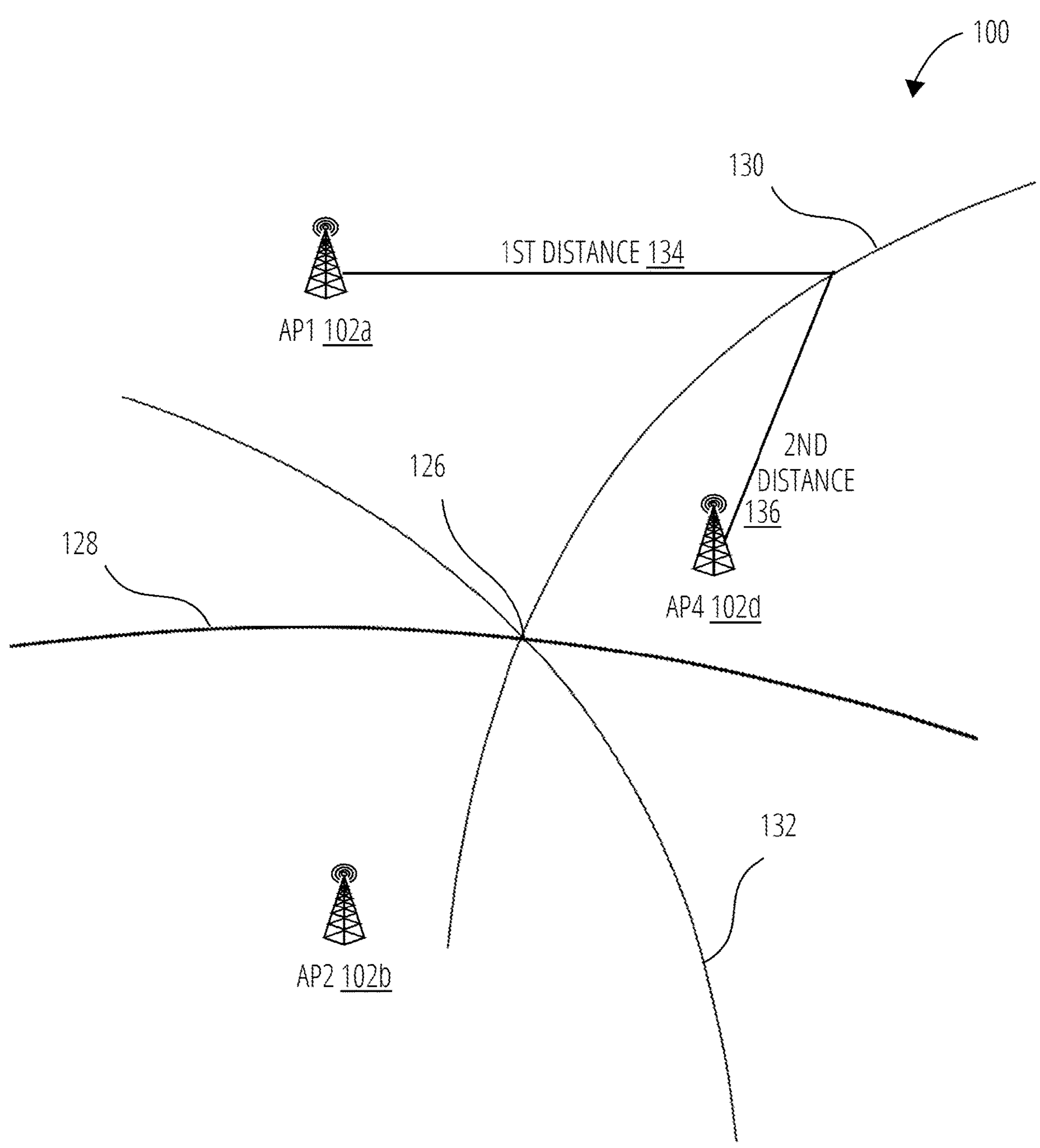
FIG. 1D illustrates a diagram for an example of time difference of arrival (TDoA) ranging in a wireless network, in accordance with some embodiments.

FIG. 1D illustrates a non-limiting example in which a time difference of arrival (TDoA) measurement scheme is used to determine the location of the UE 106. For example, a pair of APs (e.g., AP1 102*a* and AP4 102*d*) can observe the time of arrival for signals from the UE 106, and then the APs can compare their respective measured times for the observed signals from the UE 106 to determine a time difference. Based on this time difference, the UE 106 can be determined to be located on a locus of points defining a hyperbola.

As shown in the FIG. 1D, when the difference between the 1st distance 134 from AP1 102*a* and the 2nd distance 136 from AP4 102*d* is constant, the resulting locus of points defines the 1st hyperbola 130. Similarly, a time difference between observations by AP1 102*a* and AP2 102*b* of the signals from UE 106 can be used to generate the 2nd hyperbola 128, and a time difference between observations by AP1 102*a* and AP2 102*b* and AP4 102*d* can be used to generate the 3rd hyperbola 132. These three hyperbolas intersect near point 126, indicating that is the location of UE 106.

Further, a combination of ToF and TDoA schemes can be used. For example, a ToF scheme can be used with AP1 102*a*, AP2 102*b*, and AP4 102*d* functioning as RSTAs to perform a timing-measurement exchange with UE 106, and AP3 102*c* and/or AP5 102*e* can be on the same channel observing one or more the timing-measurement exchange with UE 106. The timing-measurement exchange can be used to determine the location of UE 106 using a ToF scheme and circle-based multi-lateration, which location is then augmented and further refined using the hyperbolas generated from the timing observations by AP3 102*c* and AP5 102*c*.

Additionally, by reporting to the WLAN controller 108 both the timing-measurement exchanges with the RSTAs and also the observations the timing-measurement exchange by the other APs, the WLAN controller 108 can determine time differences of arrival for various combinations of the APs. Based on these time differences of arrival and the known locations of the APs, the WLAN controller 108 can determine hyperbolas along which the UE 106 is located, and these hyperbolas can be used to augment and further refine the predicted location of UE 106 based on hyperbola intersection.

Figure 2:
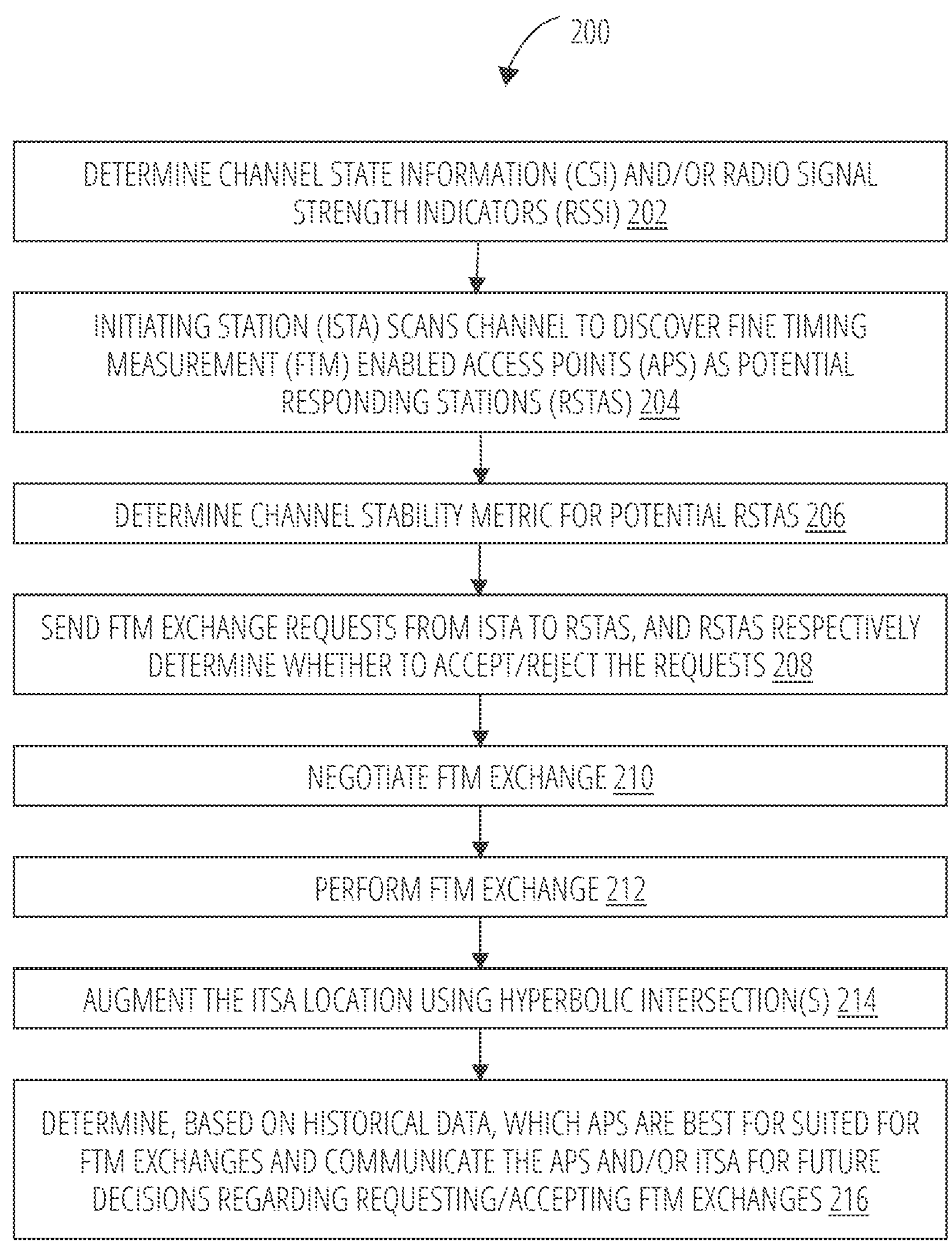
FIG. 2 illustrates a flow diagram of a method for performing ranging using a fine timing measurement (FTM) exchange, in accordance with some embodiments.

FIG. 2 illustrates an example method 200 for determining the location of an ISTA. Although the example method 200 depicts a particular sequence of operations, the sequence may be altered without departing from the scope of the present disclosure. For example, some of the operations depicted may be performed in parallel or in a different sequence that does not materially affect the function of method 200. In other examples, different components of an example device or system that implements method 200 may perform functions at substantially the same time or in a specific sequence. Here, method 200 is illustrated using a non-limiting example in which the timing measurements are fine timing measurements (FTM), such as those described in IEEE Std 802.11-2020 and in IEEE 802.11az, but the method is not limited to these illustrative examples.

According to some examples, step 202 of method 200 includes determining channel state information (CSI) and/or radio signal strength indicators (RSSI). The CSI and RSSI indicate how stable the channel is and the strength of the given channel. Step 202 can be performed before or after step 204. For example, the CSI values can be previously acquired for another network function other than timing measurements. Similarly, the RSSI values can be previously acquired for another network function other than timing measurements. Other network measurements can also be performed, such as 802.11k neighbor reports. These values can be reported to and stored at the WLAN controller 108 or the network controller 114. Alternatively or additionally, the measured values and values derived therefrom can be reported to and stored at the UE 106 or at one or more of the APs.

These values (e.g., CSI, RSSI, etc.) can then be used to determine the channel stability between the UE 106 and respective APs. For example, these values can be used to determine a channel stability metric that represents a likelihood of fluctuations in the capacity/availability of the channel to provide reliable timing measurements.

According to some examples, step 204 of method 200 includes an initiating station (ISTA) scanning one or more channels to discover fine timing measurement (FTM) enabled access points (APs) as potential responding stations (RSTAs). For example, the ISTA can scan a new channel using various probe requests/responses. Based on this scanning, the ISTA discovers FTM-enabled APs. In most cases, a single AP has two or more radios, which all are FTM-enabled.

According to some examples, step 206 of method 200 includes determining values for a channel stability metric for potential RSTAs. As discussed above, the channel stability metric can be based on the RSSI and CSI values obtained in step 202. For example, these values can be used to determine a channel stability metric that represents the likelihood of fluctuations in the capacity/availability of the channel to provide reliable timing measurements. The channel stability metric can be based on statistical information, such as values of the RSSI and CSI as a function of time.

For example, a channel affected by multi-path signals would be a poor candidate for timing measurements because of the possibility that the determined distance might not represent the line-of-sight (LoS) signal, but instead could result from or be corrupted by the multi-path signals. Further, a channel affected by significant multi-path signals would exhibit channel fading due to constructive/destructive interference between the multi-path and LoS signals, resulting in a poor value for the channel stability metric, and thereby indicating that the channel would be a poor candidate for timing measurements.

According to certain non-limiting examples, the APs measure the instability metric for the different channels/radios that the ISTA ranged against. The value of the instability metric can be a function that varies with respect to various inputs, such as location, direction, etc. The instability metric may thus be recorded and analyzed by the wireless system 100 and then used to predict channel stability in the future.

According to some examples, step 208 of method 200 includes sending FTM exchange requests from ISTA to RSTAs, and the RSTAs respectively determine whether to accept/reject the requests. According to certain non-limiting examples, step 208 can be performed as part of the negotiation in step 210.

For example, as the ISTA initiates a new FTM exchange, the RSTA uses the parameters in the ISTA request to compute the projected airtime of the entire exchange. The AP that is proposed for the RSTA can also use the CSI of the preceding probe request to predict the efficiency of the FTM exchange. A highly unstable channel will cause the obtained range to be imprecise. Thus, an RSTA for which the CSI value or the channel stability metric indicates that the channel is unstable can reject the FTM exchange. For example, the RSTA can reject the exchange using an override with a burst value of zero. By rejecting the FTM exchange, an AP that is unsuitable for FTM exchanges encourages the ISTA to find a better RSTA, which has the benefit of improving the accuracy/precision of the determined location.

Additionally or alternatively, the AP that is proposed for the RSTA can also examine its current traffic (e.g., the volume of other data traffic and the quality of service (QoS) required for the other data traffic), and, when the FTM exchange would be too disruptive to other data traffic that has a high value for the QoS, the AP can reject the FTM exchange.

According to some examples, step 210 of method 200 includes negotiating FTM exchange at step 210. For example, the negotiations can be performed using the procedure outlined in § 11.21.6.3 of IEEE Std 802.11-2020. Further, the negotiations of the FTM exchange can be informed by the RSSI, CSI, channel stability metric, QoS of other data traffic, and various network measurements.

For example, as the ISTA initiates a new FTM exchange, the RSTA uses the parameters in the ISTA request to compute the projected airtime of the entire exchange. The RSTA can examine various information to select the optimal burst period, burst duration, period between bursts, number of bursts, and other parameters used to define the FTM exchange. For example, the RSTA can examine the CSI of the preceding probe request to decide on the predicted efficiency of the FTM exchange. A highly unstable channel will cause the obtained range to be imprecise.

Additionally or alternatively, the RSTA can examine its current traffic. For example, the RSTA can examine which QoS Access Category was indicated for received/transmitted traffic over a previous predefined interval.

Based on the examined information, the RSTA then determines the parameters that are predicted to optimize the FTM exchange. Optimizing the FTM exchange can include optimizing the parameters to achieve one or more criteria (which can sometimes be countervailing criteria), including, e.g., 1) maximizing the efficiency of the exchange (e.g., best accuracy of the range obtained); 2) minimizing the airtime/energy consumption; and 3) minimizing the disruption on the RSTA for high QoS data traffic (e.g., voice, video).

The RSTA uses the above-noted (and possibly other) metrics to override the suggested parameters in the FTM request from the ISTA. For example, for increasing values of the channel stability metric (i.e., indicating greater degrees of instability), the RSTA can select parameters for the FTM exchange to decrease the frequency of the bursts (i.e., larger durations between bursts) and increase the number of bursts (i.e., more timing-measurement exchanges). These selected parameters from the RSTA increase the chances for some of the bursts representing a more stable channel, and the increased number of exchanges increases the ability to detect outliers and use statistical analysis (e.g., averaging) to improve the prediction of the ISTA location.

As discussed above, when the channel is very unstable (e.g., the channel stability metric fall within a predefined highly-unstable range), the AP that is requested to be the RSTA can reject the exchange (e.g., override with 0 burst value). This rejection has the benefit of minimizing the airtime and energy expenditure of an FTM exchange that is expected to provide a poor result. Similarly, the AP overrides the ISTA parameters with smaller and more spaced bursts when high QoS traffic is present on the AP. This rejection has the benefit of minimizing the disruption caused by the insertion of the FTM exchanges into the flows.

According to some examples, step 212 of method 200 includes performing FTM exchange. The FTM exchange is described in greater detail below with reference to FIG. 3A and FIG. 3B. Here it is noted that several parameters of the FTM exchange can be adapted, as discussed above with reference to step 210.

According to some examples, step 214 of method 200 includes augmenting the ISTA location using hyperbolic intersection(s). As discussed above with reference to FIG. 1D, hyperbolas representing possible locations of the ISTA can be generated from observations by two APs on the same channel and determining arrival times of signals from the ISTA. Based on these observations a TDoA scheme can be used to determine a time difference measured by the two APs, and this time difference can then be used to determine the difference in lengths of the first AP to the ISTA relative to the length from the second AP to the ISTA. This difference in lengths defines a hyperbola (having two components/branches), and the ISTA is located somewhere along (or near) this hyperbola. A separate hyperbola can be generated for each pair of APs that are on the same channel and are observing arrival times for the signals from the ISTA. That is, for n APs on the same channel, the number of hyperbolas that can be generated is the factorial of (n−1) (i.e., (n−1)!). The ISTA can operate on more than one channel (e.g., the ISTA can have multiple radios transmitting in different frequency bands or the ISTA can have one radio switch between channels).

For example, other APs on the same channel as the RSTA report to the infrastructure location engine the times observed by the other APs for the FTM exchange between the RSTA. The time difference of arrival for the RSTA and/or the other APs is determined by the location engine. The location engine can be located in the WLAN controller 108, the network controller 114, one or more APs, or distributed among a combination therefor. When the locations of the APs are known, the reported observations of the FTM exchange can be used to locate the ISTA along a locus of points defined by a hyperbola, which intersects with the locus of points (e.g., a circle/sphere) found using the FTM exchange, thereby increasing the accuracy of the location of the ISTA (as determined by the location engine). That is step 214 can augment the multi-lateration of the FTM exchange using a hyperbolic intersection technique.

According to some examples, step 216 of method 200 includes determining, based on historical data, which APs are best suited for FTM exchanges and communicating this information to the APs and/or ISTA for future decisions regarding requesting/accepting FTM exchanges. For example, the AI processor 116 can be trained using historical data, as discussed below with reference to FIG. 4A and FIG. 4B.

According to certain non-limiting examples, the AI processor 116 can be trained to predict, based on various inputs such as which APs respond to a probe request and/or other information such as the RSSI of the responding APs, what other APs are in the neighborhood of the ISTA. Further, according to certain non-limiting examples, the AI processor 116 can be trained to predict what the RSSI values and other indicators (e.g., CSI and other relevant network measurements) will be for the other APs. The RSSI values and other indicators can be used to predict which of the other APs are good candidates for RSTAs to be used in future timing-measurement exchanges.

Here, the term "neighborhood" refers to a functional region of spatial proximity to the ISTA within which an AP transmitting at or near maximum transmit power is capable of communicating with the ISTA (e.g., has an RSSI value above a minimum RSSI value, e.g., −80 dBm). Various inputs can be relevant for predicting the other APs and for predicting the indicators that are used to determine which of these APs are the best candidates for timing-measurement exchanges. As mentioned above the known RSSI values of responding APs can be used as inputs to the AI processor 116, and predicted RSSI values can be used as indicators of which other APs are good candidates for timing-measurement exchanges. Non-limiting examples of possible inputs for the AI processor 116 can further include, e.g., CSI values, noise measurements, co-channel interference measurements, signal-to-noise ratios, signal-to-interference ratios, QoS values for other data traffic, 802.11k neighbor report, or any combination thereof. Non-limiting examples of output from the AI processor 116 of possible indicators of an APs suitability for timing-measurement exchanges can include, e.g., RSSI values, CSI values, noise values, or any combination thereof.

According to certain non-limiting examples, various inputs (e.g., RSSI values, CSI, etc.) are forwarded from the AP to the WLAN controller 108 and to the location engine. These forwarded values are collected over a period of time to generate historical data. For example, the historical data that can be used as training data for an AI processor 116. Alternatively, the predictions do not have to be made using an AI processor 116. For example, the historical data can be used to generate a statistical model using other technics (e.g., statistical methods), rather than machine learning or artificial intelligence techniques. Based on the historical values and current inputs (e.g., the inputs can be values of the respective probe requests and the RSSI for a given AP), the location engine can determine the likelihood of other APs in the neighborhood of the ISTA. Further, the location engine can determine the likely RSSI and CSI for the other APs. Using these predictions, the location engine can then program the responding APs and/or the other APs to accept or reject FTM queries based on their respective values for RSSI, CSI, and/or QoS and volume of other data traffic.

For each given ISTA's location, step 214 has the benefit of optimizing the selection of APs for timing-measurement exchanges such that the selected APs are those that are the least loaded with high QoS traffic and likely to provide the best FTM range to an ISTA. Which APs are best for the timing-measurement exchanges will change as a function of the ISTA's location, and this factor is captured by how the inputs used to make the predictions also change as a function of the ISTA's location. Further, the functions of the location engine performed at step 214 can be configured to provide the benefit that at each given location, the location engine ensures that a sufficient number of RSTAs respond by accepting the timing-measurement request to ensure proper multi-lateration).

Additionally or alternatively, the location engine and/or the AI processor 116 can include the functionality of not only predicting, at the current location of the ISTA, which APs to use for timing-measurement exchanges, but the location engine and/or the AI processor 116 can perform these predictions for a series of locations that the ISTA is predicted to traverse prospectively. For example, the ISTA may be traveling a common path, which can be predicted by the AI processor 116. Then the AI processor 116 is not limited to predicting which APs are the best candidates for RSTAs at the current instance, but the AI processor 116 can also select the best candidates for RSTAs for a series of predicted locations for predefined times in the future.

For example, in an amusement park ride, an autonomous vehicle that is part of the ride can use FTM to determine its current location and use this information to navigate to a predefined next location. The path that the autonomous vehicle can be repetitive, as the ride always follows the same path. Thus, the AI processor 116 can learn, for any given location of the autonomous vehicle, which APs are likely to provide the best FTM results while minimizing disruptions to other data traffic. Further, the AI processor 116 can learn, for any given location of the autonomous vehicle, which APs are optimal at respective times in the future (e.g., in five seconds, 10 second, 15 second from the current time, which APs are likely to provide the best FTM results while minimizing disruptions to other data traffic).

According to certain non-limiting examples, the location engine and/or the AI processor 116 records the sequences of FTM exchanges as various STAs navigate the floor (e.g., autonomous vehicle following a prescribed path). When one of the STAs discovers and queries one RSTA, the location engine determines the likely best next APs to range against. BAsed on this information, the location engine and/or the AI processor 116 can then instructs the RSTA to return to the ISTA an unsolicited 802.11k neighbor report, that indicates the recommended AP(s) for the ISTA to range against. This functionality has the benefit of allowing the ISTA to increase its FTM exchange efficiency and its location precision.

Figure 3A:
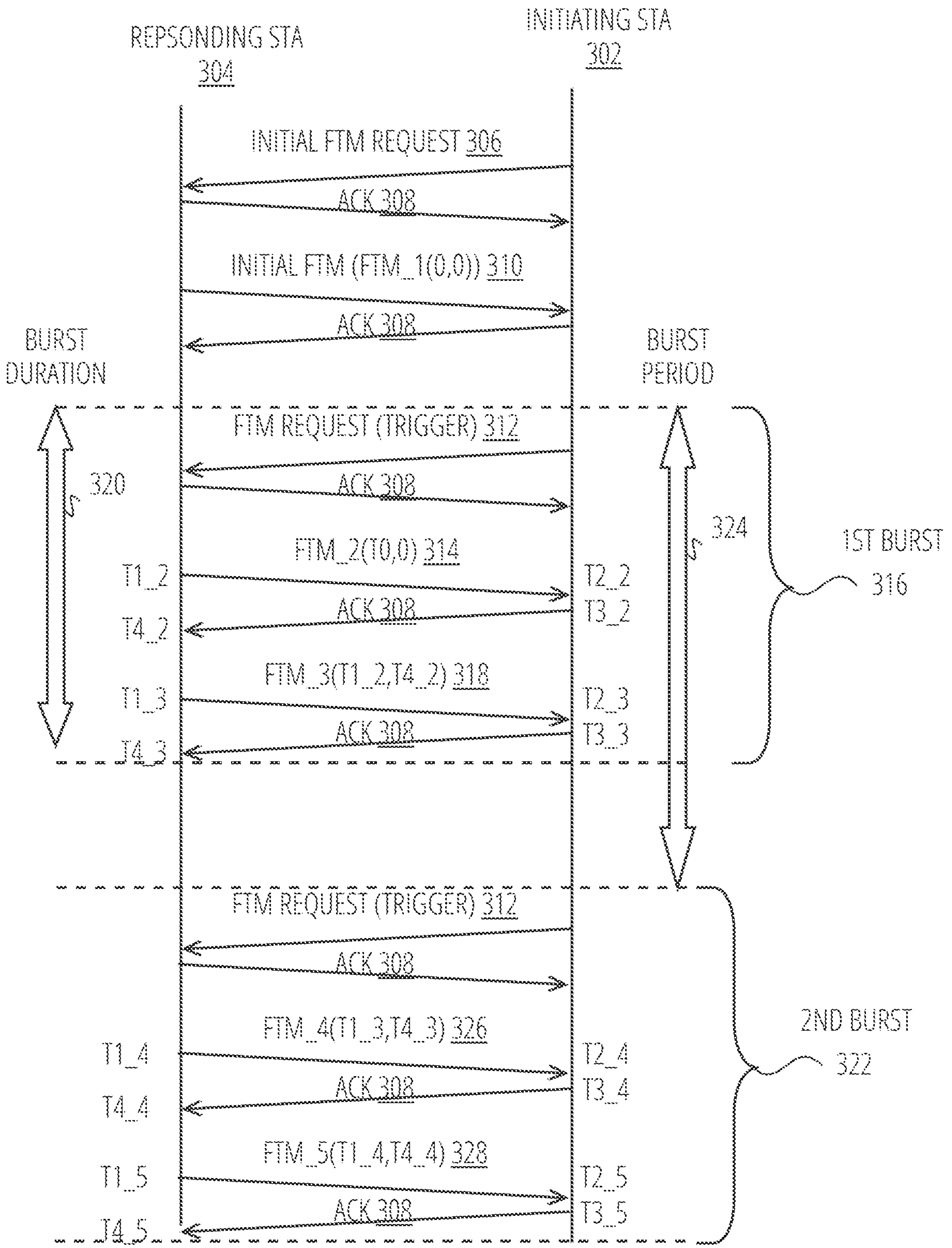
FIG. 3A illustrates a timing-flow diagram of a first example of a fine timing measurement (FTM) exchange, in accordance with some embodiments.

FIG. 3A illustrates a first non-limiting example of a timing-measurement exchange (e.g., here it is an FTM exchange). A station (e.g., ISTA 302) that supports timing measurements can transmit a timing measurement request frame (e.g., an initial FTM request 306) to a peer station (e.g., RSTA 304) to request either initiation or termination of a timing measurement procedure, depending on a value set for a trigger field in the request frame. A station (STA) that supports the timing measurement procedure may transmit timing measurement frames addressed to a peer STA that also supports the timing measurement procedure. Timing measurement frames can be used for synchronizing a local clock time between STAs and/or determining a location of one or more of the STAs. The timing measurement frames and the corresponding acknowledgment (Ack) frames can be transmitted using a single transmit chain, for example.

Generally, a sending STA transmits timing measurement frames in overlapping pairs. The first timing measurement frame of a pair contains a nonzero value in the dialog token field. With the first timing measurement frame, both STAs capture timestamps. The sending STA captures the time at which the timing measurement frame is transmitted (t1). The receiving STA captures the time at which the timing measurement frame arrives (t2) and the time at which the Ack frame response is transmitted (t3). The sending STA captures the time at which the Ack frame arrives (t4). In the follow-up timing measurement frame, the sending STA transfers the timestamp values it captured (t1 and t4) to the receiving STA. The offset of the clock at the receiving STA with respect to the clock at the sending STA can be calculated using $$\text{Clock offset at receiving } STA \text{ relative to sending } STA = [(t2 - t1) - (t4 - t3)]/2.$$

The FTM procedure allows an STA to determine its distance from another STA. To obtain its location, the ISTA performs this procedure with multiple RSTAs whose locations are known.

An FTM session is an instance of an FTM procedure between an initiating STA (ISTA) and a responding STA (RSTA). An FTM session can be subdivided into three parts: negotiation, measurement exchange, and termination. An STA may have multiple concurrent FTM sessions. Here, the disclosure focuses on a single session occurring at a given time. Overlapping sessions can be managed, e.g., in accordance with procedures in § 11.21.6 of IEEE Std 802.11-2020, as would be understood by a person of ordinary skill in the art.

The FTM exchange includes several burst instances, which are respectively the time windows extending from a time of departure (TOD) measurement is sent until a time of arrival (TOA) measurement the corresponding/subsequent acknowledgment message are received at their respective destinations. The timing of the burst instances can include, e.g.: (1) a burst duration 320 (e.g., the duration of each burst instance starting at the boundary of a burst period) and (2) a burst period 324 (e.g., the interval from the beginning of one burst instance to the beginning of the following).

The initiating STA transmits an initial FTM request 306. For example, the initial FTM request 306 can be transmitted without a measurement request element and fine-timing measurement parameters. Further, the initial FTM request 306 can be transmitted from the ISTA 302 with the trigger field set to 1, indicating to the responding STA that the initiating STA is available for a burst instance (e.g., the message sequence of initial FTM (FTM_1(0,0)) 310 followed by Ack 308) of burst duration 320.

In response to the initial FTM request 306, the RSTA 304 can transmit an Ack 308 frame. Additionally, the RSTA 304 can transmit FTMs Per Burst Fine Timing Measurement frames before the end of the burst instance. In addition, the initiating STA shall be ready to receive the initial FTM (FTM_1(0,0)) 310 frame. The initial FTM (FTM_1(0,0)) 310 frame and its retransmissions in the burst instance from the responding STA can include an FTM synchronization information element in the FTM synchronization information field. The time synchronization function (TSF) Sync Info field in the FTM synchronization information element contained in the FTM frame can be used by the ISTA 302 to synchronize its TSF with the responding STA's in order to determine the start of subsequent burst instances.

According to certain non-limiting examples, subsequent FTM frames within the burst instance do not include a Fine Timing Measurement Parameters element and do not include an FTM Synchronization Information field. Within a burst instance, the ISTA 302 performs FTM on each Fine Timing Measurement frame addressed to it, except the last Fine Timing Measurement frame. The 310 can perform FTM on the last Fine Timing Measurement frame in a burst instance. According to certain non-limiting examples, the ISTA 302 performs FTM on each Fine Timing Measurement frame addressed to it, except the last Fine Timing Measurement frame. According to certain non-limiting examples, th310 can perform FTM on the last Fine Timing Measurement frame in a burst instance.

Figure 3B:
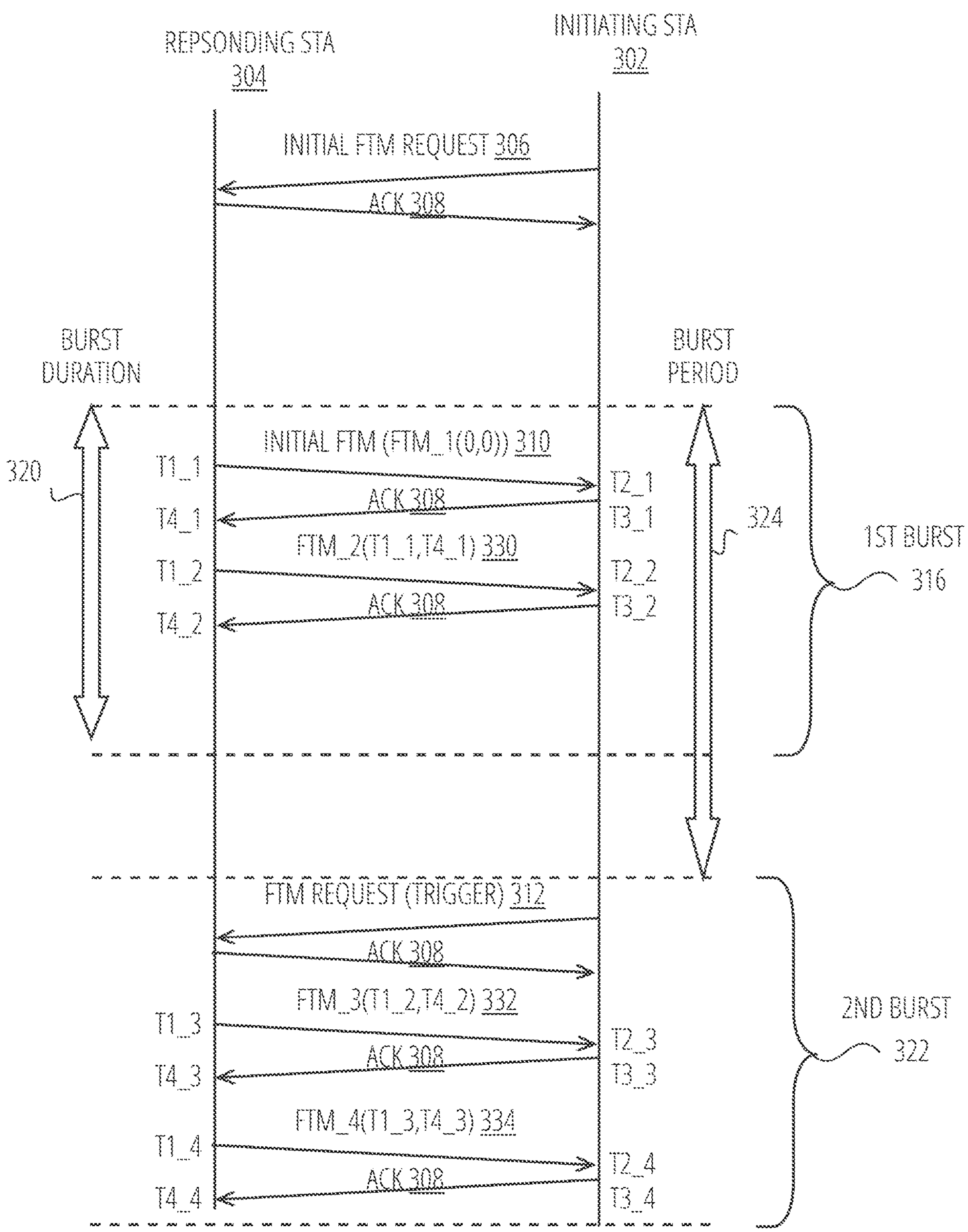
FIG. 3B illustrates a timing-flow diagram of a second example of a FTM exchange, in accordance with some embodiments.

FIG. 3A illustrates an example of a negotiation and measurement exchange sequence in which the ASAP is set to "0" and FTMs Per Burst is set to "2." In contrast, FIG. 3B illustrates an example of a negotiation and measurement exchange sequence in which the ASAP is set to "1" and FTMs Per Burst is set to "2." FIG. 3A illustrates two bursts (i.e., a 1st burst 316 and a 2nd burst 322) with a burst period 324 and a burst duration 320. Each burst begins with an FTM request (trigger) 312 frame followed by an Ack 308 frame, which is then followed by a sequence of two FTM frames that are each followed by an Ack 308 frame.

In the 1st burst 316, RSTA 304 sends, at time t1_2, the FTM_2(t0,0) 314 frame, which is received at ISTA 302 at time t2_2. The subsequent Ack 308 frame is sent at t3_2 and received at t4_2. Next, RSTA 304 sends, at time t1_3, the FTM_3(t1_2,t4_2) 318 frame, which is received at ISTA 302 at time t2_3. The subsequent Ack 308 frame is sent at T3_3 and received at t4_3. The FTM_3(t1_2,t4_2) 318 frame includes the measured times t1_2 and t4_2. After the ISTA 302 receives these two time values, the ISTA 302 has all of the information need to calculate the distance based on the 2nd exchange. For the ith FTM exchange, the ISTA 302 can then compute the distance from the RSTA 304 using the expression $$\text{distance} = (t4\_i - t1\_i) - (t3\_i - t2\_i)c/2),$$

where c is the speed of light.

In the 2nd burst 322, RSTA 304 sends, at time t1_4, the FTM_4(t1_3,t4_3) 326 frame, which is received at ISTA 302 at time t2_4. The subsequent Ack 308 frame is sent at T3_4 and received at t4_4. The FTM_4(t1_3,t4_3) 326 frame includes the measured times t1_3 and t4_3. Next, RSTA 304 sends, at time t1_5, the FTM_5(t1_4,t4_4) 328 frame, which is received at ISTA 302 at time t2_5. The subsequent Ack 308 frame is sent at T3_5 and received at t4_5. The FTM_5(t1_4,t4_4) 328 frame includes the measured times t1_4 and t4_4.

FIG. 3B illustrates an example of a negotiation and measurement exchange sequence in which the ASAP is set to "1" and FTMs Per Burst is set to "2." FIG. 3B illustrates two bursts (i.e., a 1st burst 316 and a 2nd burst 322) with a burst period 324 and a burst duration 320. Each burst begins with an FTM request (trigger) 312 frame followed by an Ack 308 frame, which is then followed by a sequence of two FTM frames that are each followed by an Ack 308 frame.

In the 1st burst 316, RSTA 304 sends, at time t1_1, the 310 frame, which is received at ISTA 302 at time t2_1. The subsequent Ack 308 frame is sent at T3_1 and received at t4_1. Next, RSTA 304 sends, at time t1_2, the FTM_2(t1_1, t4_1) 330 frame, which is received at ISTA 302 at time t2_2. The subsequent Ack 308 frame is sent at T3_2 and received at t4_2. The FTM_2(t1_1,t4_1) 330 frame includes the measured times t1_1 and t4_1. After the ISTA 302 receives these two time values, the ISTA 302 has all of the information need to calculate the distance based on the 1st exchange. For the ith FTM exchange, the ISTA 302 can then compute the distance from the RSTA 304 using the expression $$\text{distance} = (t4\_i - t1\_i) - (t3\_i - t2\_i)c/2),$$

where c is the speed of light.

In the 2nd burst 322, RSTA 304 sends, at time t1_3, the FTM_3(t1_2,t4_2) 332 frame, which is received at ISTA 302 at time t2_3. The subsequent Ack 308 frame is sent at t3_3 and received at t4_3. The FTM_3(t1_2,t4_2) 332 frame includes the measured times t1_2 and t4_2. Next, RSTA 304 sends, at time t1_4, the FTM_4(t1_3,t4_3) 334 frame, which is received at ISTA 302 at time t2_4. The subsequent Ack 308 frame is sent at T3_4 and received at t4_4. The FTM_5(t1_4,t4_4) 328 frame includes the measured times t1_3 and t4_3.

Figure 4A:
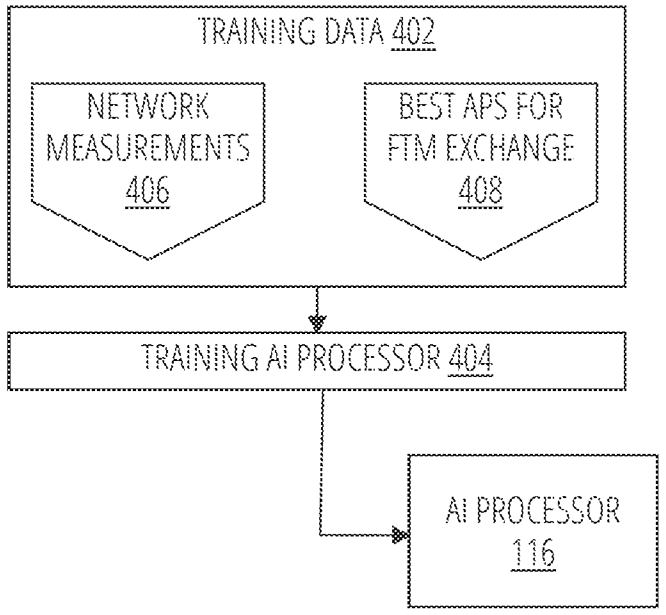
FIG. 4A illustrates a flow diagram of an example of training an artificial intelligence (AI) core, in accordance with some embodiments.

FIG. 4A illustrates an example of training the AI processor 116. Depending on the type of AI processor 116, supervised learning, unsupervised learning, semi-supervised learning, or a combination thereof can be used to train the AI processor 116. Here the non-limiting example of supervised learning is used to illustrate training the AI processor 116, and the training data 402 that is used in this example is labeled training data 402, which includes historical data 406 and labels 408.

For example, the historical data 406 can be the historical values for the types of inputs that the AI processor 116 uses to make predictions (e.g., previous network measurements, RSSI values, CSI values, 802.11k neighbor reports, a previously predicted location of the ISTA, QoS of other data traffic, an order list of which APs have been previously used for timing-measurement exchanges). For example, the path traversed by the ISTA may follow one or more typical patterns. Thus, by knowing which pattern/path the ISTA is likely traversing, the AI processor 116 can predict which APs will be close to the ISTA's next location, and, based on previous CSI, RSSI, QoS values, etc., the AI processor 116 can predict which of the APs that are close to the ISTA's next location have the best values of the channel stability metric to produce the best location predictions. Further, the labels 408, which are associated the historical data 406, can be historical values for the accuracy and/or precision of location predictions generated for particular choices of RSTAs. Thus, based a given set of inputs, the AI processor 116 is trained to predict, which candidates APs for the RSTA provide the best location measurements. Here, the best location measurement can mean the most accurate, most precise, the least disruptive to other data traffic, or a combination thereof.

In the process of AI training 404, training data 402 is applied to training the AI processor 116. The AI processor 116 can be an artificial neural network (ANN) that is trained via supervised learning using a backpropagation technique to train the weighting parameters between nodes within respective layers of the ANN. In supervised learning, a set of training data 402 is obtained, and the network is iteratively updated to reduce an error/loss function. The value of the error/loss function decreases as the AI processor 116 outputs configurations that increasingly approximate the labels 408 (e.g., the best APs to be used for timing-measurement exchanges). In other words, ANN infers the mapping implied by the training data, and the error/loss function produces an error value related to the mismatch between the labels 408 and the output from the AI processor 116 that is produced by applying the historical data 406 to the AI processor 116. For example, in certain implementations, the cost function can use the mean-squared error to minimize the average squared error. In the case of a multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods and particle swarm optimization, can also be used for training the AI processor 116.

The AI training 404 of the AI processor 116 can also include various techniques to prevent overfitting to the training data 402 and for validating the trained AI processor 116. For example, boot strapping and random sampling of the training data 402 can be used during training.

In addition to supervised learning used to initially train the AI processor 116, the AI processor 116 can be continuously trained while being used by using reinforcement learning based on the network measurements and the corresponding configurations used on the network. The AI processor 116 can be cloud based and can be trained using network measurements and the corresponding configurations from other networks that provide feedback to the cloud.

Further, other machine learning (ML) algorithms can be used for the AI processor 116, and the AI processor 116 is not limited to being an ANN. For example, there are many machine-learning models, and the AI processor 116 can be based on machine-learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 4B:
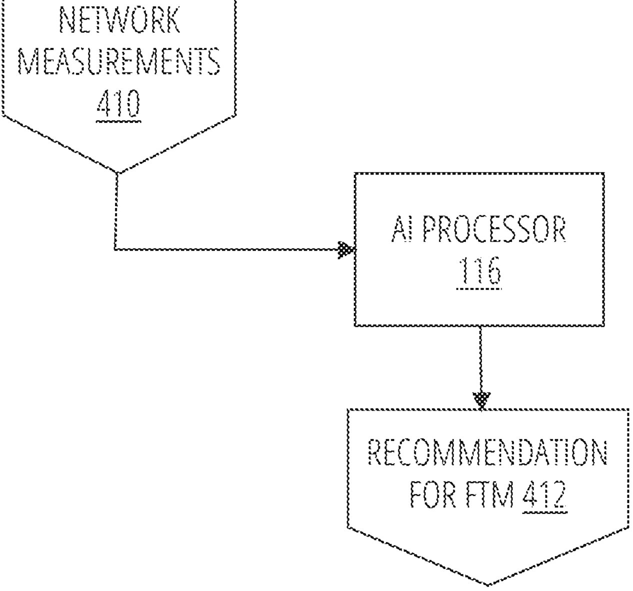
FIG. 4B illustrates a flow diagram of an example of using the AI core, in accordance with some embodiments.

FIG. 4B illustrates an example of using the trained AI processor 116. The actual network measurements are applied to the trained AI processor 116, which then generated AI outputs 412 (e.g., recommendations for timing-measurement exchanges). The AI outputs 412 will then be provided, via the WLAN controller 108 and/or network controller 114) to the UE 106 and/or one or more of the APs which use the AI outputs 412 to more optimal perform the timing measurement and determine the location of the UE 106 (i.e., the ISTA).

Figure 5:
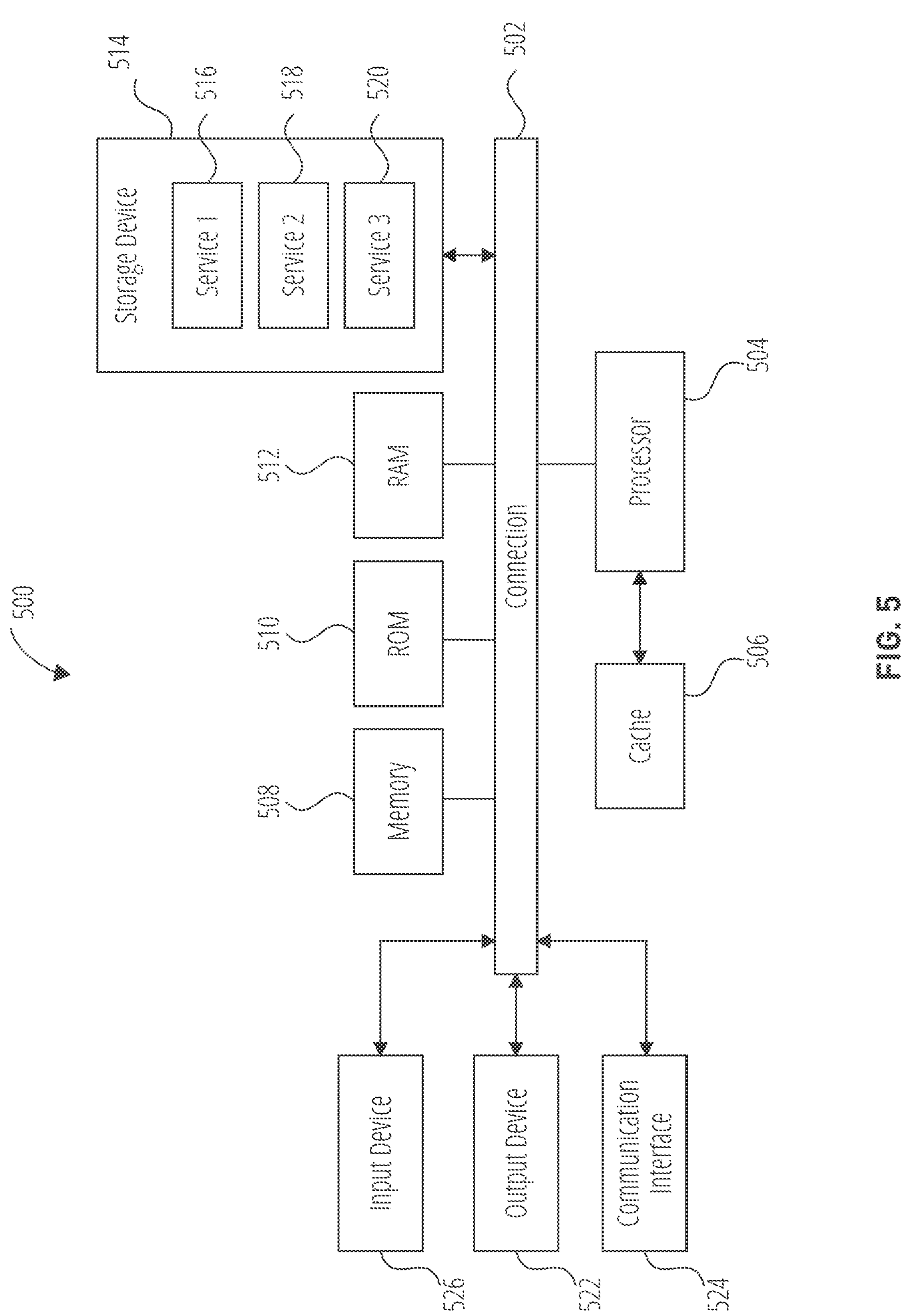
FIG. 5 illustrates a block diagram of an example of a computing device, in accordance with some embodiments.

FIG. 5 shows an example of computing system 500, which can be for example any computing device making up the UE 106, the APs (e.g., AP1 102*a*, AP2, . . . . AP5 102*e*), AI processor 116, the network controller 114106, the WLAN controller 108, or any component thereof in which the components of the system are in communication with each other using connection 502. Connection 502 can be a physical connection via a bus, or a direct connection into processor 504, such as in a chipset architecture. Connection 502 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 500 includes at least one processing unit (CPU or processor) processor 504 and connection 502 that couples various system components including system memory 508, such as read-only memory (ROM) 510 and random access memory (RAM) 512 to processor 504. Computing system 500 can include a cache of high-speed memory cache 506 connected directly with, in close proximity to, or integrated as part of processor 504.

Processor 504 can include any general-purpose processor and a hardware service or software service, such as services 516, 518, and 520 stored in storage device 514, configured to control processor 504 as well as a special-purpose processor where software instructions are incorporated into the actual processor design. Processor 504 may essentially be a completely self-contained computing system, containing multiple cores or processors, a bus, memory controller, cache, etc. A multi-core processor may be symmetric or asymmetric.

To enable user interaction, computing system 500 includes an input device 526, which can represent any number of input mechanisms, such as a microphone for speech, a touch-sensitive screen for gesture or graphical input, keyboard, mouse, motion input, speech, etc. Computing system 500 can also include output device 522, which can be one or more of a number of output mechanisms known to those of skill in the art. In some instances, multimodal systems can enable a user to provide multiple types of input/output to communicate with computing system 500. Computing system 500 can include communication interface 524, which can generally govern and manage the user input and system output. There is no restriction on operating on any particular hardware arrangement, and therefore the basic features here may easily be substituted for improved hardware or firmware arrangements as they are developed.

Storage device 514 can be a non-volatile memory device and can be a hard disk or other types of computer-readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 514 can include software services, servers, services, etc., that when the code that defines such software is executed by the processor 504, it causes the system to perform a function. In some embodiments, a hardware service that performs a particular function can include the software component stored in a computer-readable medium in connection with the necessary hardware components, such as processor 504, connection 502, output device 522, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a network devices and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for timing measurement in a wireless network to determine a location of a station (STA), the method comprising:

determining a channel stability of a first channel between an initiating station (ISTA) and a first responding station (RSTA);

sending, between the ISTA and the first RSTA, a request for a first timing-measurement exchange;

negotiating parameters for the first timing-measurement exchange between the ISTA and the first RSTA based on the determined channel stability;

performing the first timing-measurement exchange between the ISTA and first RSTA in accordance with the parameters and generating thereby a first set of times;

determining, based on historical data and one or more current network measurements, a preferred subset of access points (APs) among a set of APs in a neighborhood of the ISTA for use as responding stations for timing-measurement exchanges;

steering the ISTA to perform another timing-measurement exchange with a second RSTA in the preferred subset by causing at least one AP outside the preferred subset to decline a timing-measurement exchange request from the ISTA;

performing the another timing-measurement exchange between the ISTA and the second RSTA to generate a second set of times;

determining a location of the ISTA based on the first set of times and the second set of times; and selecting, after negotiating the first timing-measurement exchange between the ISTA and the first RSTA, a next AP for the ISTA to request a timing-measurement exchange, wherein the next AP is selected based on a prediction by a machine learning (ML) method that has been trained using historical data of sequences of fine timing measurement (FTM) exchanges in a neighborhood of the ISTA.

2. The method of claim 1, wherein determining the channel stability comprises determining a channel stability metric based on channel state information (CSI) and a received signal strength indicator (RSSI).

3. The method of claim 2, further comprising:

determining, based on a value of the channel stability for the first RSTA, a first weight based on a degree of uncertainty for the first set of times;

determining, based on a value of the channel stability metric for the second RSTA, a second weight based on a degree of uncertainty for the second set of times; and determining the location of the ISTA based on the second weight, the first weight, the first set of times, and the second set of times.

4. The method of claim 1, wherein negotiating the parameters for the first timing-measurement exchange is based on the determined channel stability, a quality of service (QoS) indicated for other data traffic on the first RSTA, a volume of the other data traffic on the first RSTA, channel state information (CSI), a received signal strength indicator (RSSI), and/or a predicted efficiency of the first timing-measurement exchange.

5. The method of claim 1, further comprising: predicting values for respective APs in a neighborhood of the ISTA, wherein the predicted values include channel state information (CSI), values for a received signal strength indicator (RSSI), and/or quality of service (QoS) values of traffic for the respective APs; and determining, based on the predicted values, the preferred subset of APs for use as responding stations for timing-measurement exchanges, including recommending to the ISTA one or more candidate APs within the preferred subset for the first RSTA and/or the second RSTA.

6. The method of claim 1, further comprising: recommending to the ISTA one or more APs as candidate APs for the first RSTA and/or the second RSTA, wherein the candidate APs are determined based on an ML method that uses the historical data to predict, for respective APs in a neighborhood of the ISTA, channel state information (CSI), values for a received signal strength indicator (RSSI), and/or quality of service (QoS) values of traffic for the respective APs.

7. The method of claim 1, wherein negotiating the parameters for the first timing-measurement exchange further comprises the first RSTA determining, based on the determined channel stability, whether to accept or reject the first timing-measurement exchange.

8. The method of claim 1, further comprising: instructing the first RSTA to return values of a neighbor report; and selecting, using the values of a neighbor report, the next AP for the ISTA to request the timing-measurement exchange.

9. The method of claim 1, wherein: the ML method selects the next AP based on one or more inputs that include a predicted location of the ISTA, channel state information (CSI), values for a received signal strength indicator (RSSI), and/or quality of service (QoS) values of traffic for the first RSTA or the second RSTA.

10. The method of claim 1, wherein: the ML method selects the next AP based on a score that is representative of a likely accuracy of the location that is obtained from a timing-measurement exchange between the ISTA and the next AP.

11. The method of claim 1, wherein: the ML method selects the next AP based on a score that is representative of a likelihood that a timing-measurement exchange between the ISTA and the next AP interferes with other traffic on the next AP that has a predefined QoS.

12. The method of claim 1, further comprising: determining, by a network controller, a set of APs that are in the neighborhood of the ISTA; recommending a first subset of APs of the set of APs that are likely to provide better timing-measurement exchanges than a second subset of APs of the set of APs that excludes the first subset of APs; and steering the ISTA to perform the first timing-measurement exchange or the another timing-measurement exchange with APs in the first subset by causing at least one AP in the second subset to decline a timing-measurement exchange request from the ISTA.

13. The method of claim 12, wherein steering the ISTA to perform the first timing-measurement exchange or the another timing-measurement exchange with the APs in the first subset is performed by: sending a first instruction to the second subset of APs to reject requests for timing-measurement exchanges from the ISTA.

14. The method of claim 1, further comprising: determining, based on the first set of times, a first locus of points along which the ISTA is predicted to be located; determining, based on the second set of times, a second locus of points along which the ISTA is predicted to be located; and determining a location of the ISTA based on an intersection between the first locus of points and the second locus of points.

15. The method of claim 14, wherein the first set of times and the second set of times represent time of flight (ToF) values, the first locus of points forming a first circle, and the second locus of points forming a second circle.

16. The method of claim 14, further comprising: receiving, at a location engine, the first set of times and the second set of times, wherein the first set of times and the second set of times represent time of flight (ToF) values, the first locus of points is a first circle, and the second locus of points is a second circle; receiving, from one or more APs on a same channel as the first RSTA, observations of the first timing-measurement exchange between the ISTA and the first RSTA to generate a third set of times representing time difference of arrival (TDoA) values; determining, based on the third set of times, a third locus of points that represents a hyperbola; and determining the location of the ISTA based on the first locus of points, the second locus of points, and the third locus of points.

17. The method of claim 1, wherein negotiating the timing measurements between the ISTA and the RSTA is further based on an amount of traffic through the first RSTA, and a level of quality of service (QoS) indicated for the traffic through the first RSTA.

18. A computing apparatus comprising:
a processor; and
a memory storing instructions that, when executed by the processor, configure the computing apparatus to:
determine a channel stability of a first channel between an initiating station (ISTA) and a first responding station (RSTA);
send, between the ISTA and the first RSTA, a request for a first timing-measurement exchange;
negotiate parameters for the first timing-measurement exchange between the ISTA and the first RSTA based on the determined channel stability;
perform the first timing-measurement exchange between the ISTA and first RSTA in accordance with the parameters and generating thereby a first set of times;
determine, based on historical data and one or more current network measurements, a preferred subset of access points (APs) among a set of APs in a neighborhood of the ISTA for use as responding stations for timing-measurement exchanges;
steer the ISTA to perform another timing-measurement exchange with a second RSTA in the preferred subset by causing at least one AP outside the preferred subset to decline a timing-measurement exchange request from the ISTA;
perform the another timing-measurement exchange between the ISTA and the second RSTA to generate a second set of times;

determine a location of the ISTA based on the first set of times and the second set of times; and select, after negotiating the first timing-measurement exchange between the ISTA and the first RSTA, a next AP for the ISTA to request a timing-measurement exchange, wherein the next AP is selected based on a prediction by a machine learning (ML) method that has been trained using historical data of sequences of fine timing measurement (FTM) exchanges in a neighborhood of the ISTA.

19. A non-transitory computer-readable storage medium including instructions that when executed by a computer, cause the computer to:

determine a channel stability of a first channel between an initiating station (ISTA) and a first responding station (RSTA);

send, between the ISTA and the first RSTA, a request for a first timing-measurement exchange;

negotiate parameters for the first timing-measurement exchange between the ISTA and the first RSTA based on the determined channel stability;

perform the first timing-measurement exchange between the ISTA and first RSTA in accordance with the parameters and generating thereby a first set of times;

determine, based on historical data and one or more current network measurements, a preferred subset of access points (APs) among a set of APs in a neighborhood of the ISTA for use as responding stations for timing-measurement exchanges;

steer the ISTA to perform another timing-measurement exchange with a second RSTA in the preferred subset by causing at least one AP outside the preferred subset to decline a timing-measurement exchange request from the ISTA;

perform the another timing-measurement exchange between the ISTA and the second RSTA to generate a second set of times; and determine a location of the ISTA based on the first set of times and the second set of times;

select, after negotiating the first timing-measurement exchange between the ISTA and the first RSTA, a next AP for the ISTA to request a timing-measurement exchange, wherein the next AP is selected based on a prediction by a machine learning (ML) method that has been trained using historical data of sequences of fine timing measurement (FTM) exchanges in a neighborhood of the ISTA.

* * * * *